(12) United States Patent
Okajima et al.

(10) Patent No.: US 6,624,851 B1
(45) Date of Patent: Sep. 23, 2003

(54) AUTOMATIC FOCUSING DEVICE OF IMAGE PICKUP DEVICE AND METHOD OF CORRECTING ZOOM TRACKING CURVE

(75) Inventors: Tadashi Okajima, Amagasaki (JP); Kazuhiko Sugimoto, Shijyounawate (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/180,902

(22) PCT Filed: May 16, 1997

(86) PCT No.: PCT/JP97/01672

§ 371 (c)(1),
(2), (4) Date: Nov. 16, 1998

(87) PCT Pub. No.: WO97/44695

PCT Pub. Date: Nov. 27, 1997

(30) Foreign Application Priority Data

May 17, 1996 (JP) ............................................. 8-123449

(51) Int. Cl.⁷ ...................... G03B 13/00; H04N 5/232
(52) U.S. Cl. ........................................................ 348/347
(58) Field of Search ........................................ 348/347

(56) References Cited

U.S. PATENT DOCUMENTS 5,486,860 A * 1/1996 Shiokawa et al. .......... 348/347
6,184,932 B1 * 2/2001 Tanaka ...................... 348/347

FOREIGN PATENT DOCUMENTS

| JP | 05-060962 | | 3/1993 | |
| JP | 6-141220 | * | 5/1994 | .......... H04N/5/232 |
| JP | 06-205260 | | 7/1994 | |
| JP | 8-220414 | | 8/1996 | |

* cited by examiner

*Primary Examiner*—Andrew Christensen
*Assistant Examiner*—Eric Wisdahl
(74) *Attorney, Agent, or Firm*—Armstrong, Westerman & Hattori LLP

(57) ABSTRACT

The present invention is aimed to provide an autofocus device and a correction method of correcting a zoom tracking curve for an intermediate subject distance without increase in storage capacity. A plurality of zoom tracking curves $L1(Z)$ and $L2(Z)$ corresponding to a plurality of different subject distance and correction data $\alpha(Z)$ calculated in advance are stored in a memory 16. A control circuit 10 carries out a predetermined interpolation process using the stored plurality of zoom tracking curves and correction data to calculate a zoom tracking curve $L(Z)$ corrected with respect to a subject distance differing from the plurality of subject distance. Tracking control of focus is carried out according to this calculated zoom tracking curve.

6 Claims, 3 Drawing Sheets

AUTOMATIC FOCUSING DEVICE OF IMAGE PICKUP DEVICE AND METHOD OF CORRECTING ZOOM TRACKING CURVE

TECHNICAL FIELD

The present invention relates to autofocus devices, and more particularly, to an autofocus device including a software improved for focus tracking control of high accuracy in image sensing apparatus such as a video camera.

BACKGROUND ART

In the autofocus control of image sensing apparatus such as a video camera, focus tracking control is carried out according to each zoom position on the basis of a zoom tracking curve indicating the relationship between the zoom position of a group of zoom lens and the focus position of a group of focus lens. A table of the data of the zoom tracking curve is stored in the memory of the autofocus device.

The zoom tracking curve differs according to the distance to a subject of interest. If tracking control of focus in high accuracy is to be carried out with respect to every subject distance, a table including all zoom tracking curves corresponding to every subject distance must be provided. Therefore, a great amount of storage capacity for data will be required.

Accordingly, only a table storing several typical zoom tracking curves, i.e., zoom tracking curves for the cases where the distance up to a subject corresponds to an infinity point and to a nearby point is provided, and zoom tracking curves corresponding to other subject distance are obtained by interpolation processing that geometrically divides between such prestored zoom tracking curves.

The calculated value of a zoom tracking curve obtained from the above-described interpolation processing by geometric division of a few number of zoom tracking curves substantially matches the design value obtained definitely for each subject distance in the design stage as far as the axis of lens and the proximity thereof is concerned.

However, in an area distant in the radial direction from the axis of lens, the error between the calculated value by interpolation processing and the design value obtained by actual designing will become greater due to spherical aberration of lens to result in a noticeable out-of focus state.

Such an error is particularly significant with respect to a subject distance that is around the middle of respective subject distance corresponding to the plurality of, for example 2, prestored zoom tracking curves used as the basis for interpolation processing. The trend of a noticeable defocused state is noted.

For the purpose of reducing such an error between a calculated value and a design value to improve the accuracy of focus tracking, a table with a greater number of zoom tracking curves must be provided. However, this induces the problem of increase in the data storage capacity and complication in data processing.

Therefore, an object of the present invention is to provide an autofocus device that has the focus tracking accuracy improved significantly without having to greatly increase the data storage capacity.

DISCLOSURE OF THE INVENTION

According to the invention defined in claim 1, an autofocus device of image sensing apparatus includes memory means for storing data of a plurality of zoom tracking curves corresponding respectively to a plurality of different subject distance and precalculated correction data, calculation means carrying out a predetermined interpolation process using said plurality of zoom tracking curves and said correction data for calculating a zoom tracking curve with respect to a subject distance differing from said plurality of subject distance, and tracking means for tracking focus according to a calculated zoom tracking curve.

According to the invention defined in claim 2, an autofocus device of image sensing apparatus includes memory means for storing data of a plurality of zoom tracking curves corresponding respectively to a plurality of different subject distance and correction data calculated according to a zoom tracking curve obtained by a predetermined interpolation process with respect to a predetermined subject distance that is intermediate said plurality of subject distance, calculation means carrying out a predetermined interpolation process using said data of a plurality of zoom tracking curves and said correction data for calculating a zoom tracking curve with respect to a subject distance differing from said plurality of subject distance, and tracking means for tracking focus according to said calculated zoom tracking curve.

According to the invention defined in claim 3, said calculation means in the autofocus device of claim 2 includes means for calculating a focus position which is said correction data subtracted from a current focused position, means for geometric-dividing said plurality of zoom tracking curves on the basis of said calculated focus position, and means for adding said correction data to said zoom tracking curve obtained by geometric division for obtaining a zoom tracking curve with respect to said different subject distance.

According to the invention defined in claim 4, said correction data is calculated according to the error between said zoom tracking curve obtained with respect to said intermediate predetermined subject distance and the design value in the autofocus device of claims 1–3.

According to the invention defined in claim 5, a method of correcting a zoom tracking curve in an autofocus device includes the steps of: preparing memory means in which are stored data of a plurality of zoom tracking curves respectively corresponding to a plurality of different subject distance and correction data calculated according to a zoom tracking curve obtained by a predetermined interpolation process with respect to a predetermined subject distance intermediate said plurality of subject distance, calculating a focus position which is said correction data subtracted from a current focused position, geometric-dividing said plurality of zoom tracking curves on the basis of said calculated focus position, and adding said correction data to said curve obtained by geometric division for obtaining a zoom tracking curve for a subject distance differing from said plurality of subject distance.

According to the invention defined in claim 6, said correction data is calculated according to the error between the zoom tracking curve obtained for said intermediate predetermined subject distance and a design value in the correction method of claim 5.

BEST MODE FOR CARRYING OUT THE INVENTION

Figure 1:
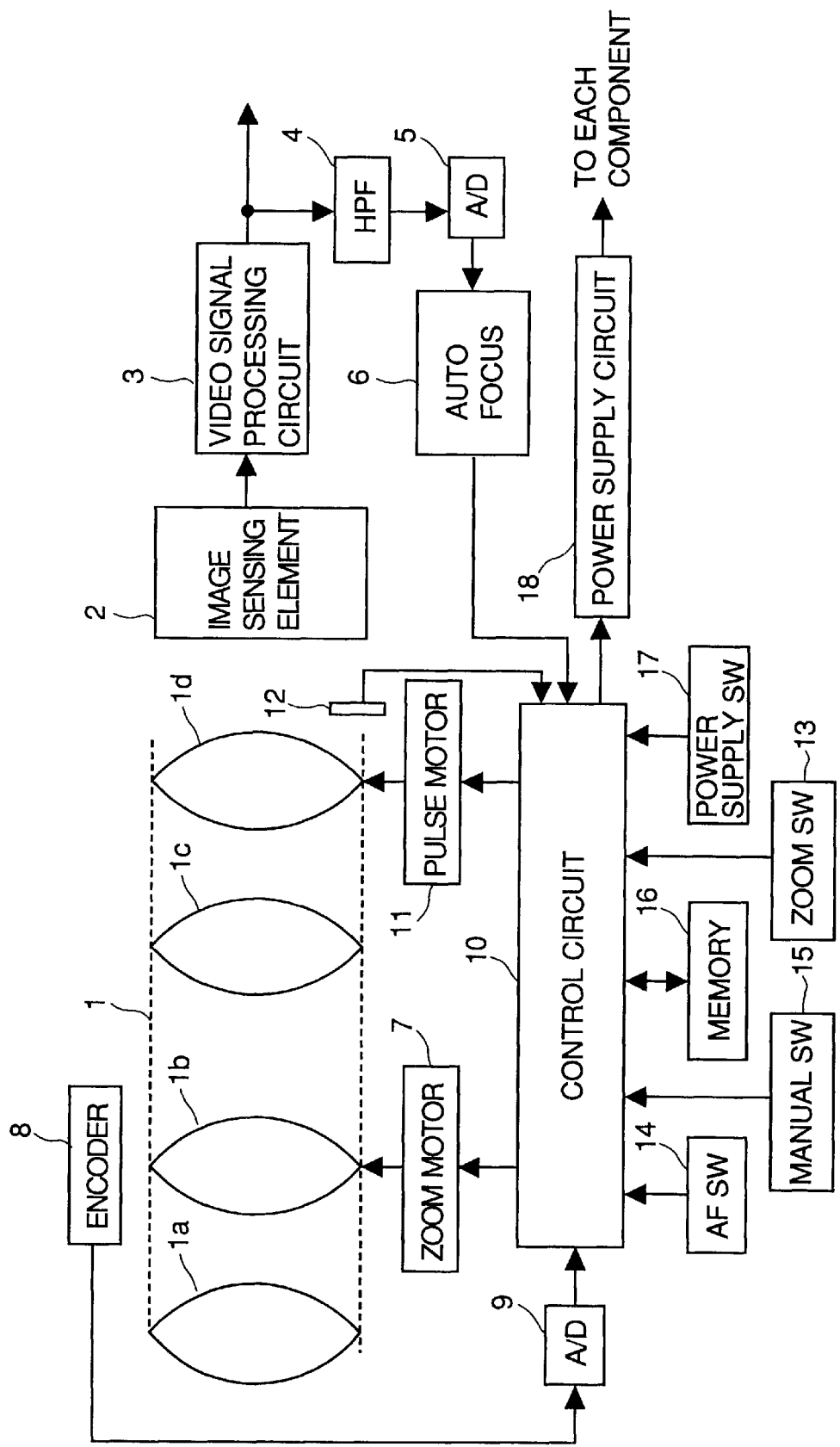
FIG. 1 is a schematic block diagram showing a structure of a video camera according to an embodiment of the present invention.

FIG. 1 is a schematic block diagram showing a structure of a video camera according to an embodiment of the present invention.

In FIG. 1, a lens unit 1 includes a front lens group 1a, a zoom lens group 1b for effecting variable magnification function, an elector lens group 1c, and a rear (focus) lens group 1d for effecting the in-focusing function.

Light from a subject not shown passes through each of the lens group in lens unit 1 to form an image on the image sensing plane of an image sensing element 2, and then converted into an electrical signal. A video signal processing circuit 3 carries out a predetermined process on the electrical signal received from image sensing element 2 for conversion into a video signal of the NTSC or PAL system.

The video signal is recorded on a recording medium by a recording circuit not shown or output outside as the pickup output of a video camera, and simultaneously has the high frequency component extracted via a high pass filter 4 to be applied to an analog/digital converter 5.

The high frequency component of the video signal that is converted into a digital signal by analog/digital converter 5 is applied to an autofocus circuit 6 as a focus evaluation value by the well-known hill-climbing autofocus control method. Autofocus circuit 6 generates and provides to a control circuit 10 the focus information to provide focus control on focus lens group 1d according to the focus evaluation value. Control circuit 10 provides the overall control of the operation of the video camera.

Zoom lens group 1b is driven by a zoom motor 7 under control of control circuit 10. The position thereof (zoom position) is detected by an encoder 8 formed of a slide volume. The detected output of encoder 8 is converted into a digital signal by an analog/digital converter 9 to be input to control circuit 10.

A pulse motor can be used as zoom motor 7. In this case, encoder 8 is not required. Control circuit 10 will discern the zoom position according to the number of driven pulses output from the pulse motor.

Focus lens group id is driven by a pulse motor 11 under control of control circuit 10. A reference position sensor 12 generates and provides to control circuit 10 a detection signal when focus lens group 1d is located at a preset reference position.

Since pulse motor 11 rotates in proportion to the number of driven pulses input from control circuit 10, control circuit 10 identifies the position (focus position) of focus lens group id according to the output of reference position sensor 12 and the number of driven pulses output towards pulse motor 11.

Control circuit 10 is further connected with a zoom switch 13, a focus mode switch 14, and a manual focus switch 15.

The user operates zoom switch 13 to drive zoom motor 7, whereby the zoom position is altered.

When the user operates focus mode switch 14 to select an autofocus mode, control circuit 10 drives pulse motor 11 according to the focus information signal from autofocus circuit 6, whereby focus lens group 1d is moved so that the focus evaluation value is maximum.

When the user operates focus mode switch 14 to select a manual focus mode, pulse motor 11 is driven upon operation of manual focus switch 15 by the user. As a result, the focus position is altered.

Control circuit 10 is yet further connected with a non-volatile memory 16 in which various distance information and position information of the data for a zoom tracking curve are stored, and a power supply switch 17. A power supply circuit 18 serves to supply power to each element in the video camera. Control circuit 10 controls the operation of power supply circuit 18 according to manipulation of power supply switch 17 by the user.

In an autofocus operation of the video camera shown in FIG. 1, control circuit 10 calculates the focus position (focused position) of focus lens group 1d corresponding to the position (zoom position) of zoom lens group 1b detected by encoder 8, according to the zoom tracking curve obtained by an interpolation process of the plurality of zoom tracking curves prestored in memory 16. Focus lens group 1d is moved to the calculated focus position.

Figure 2:
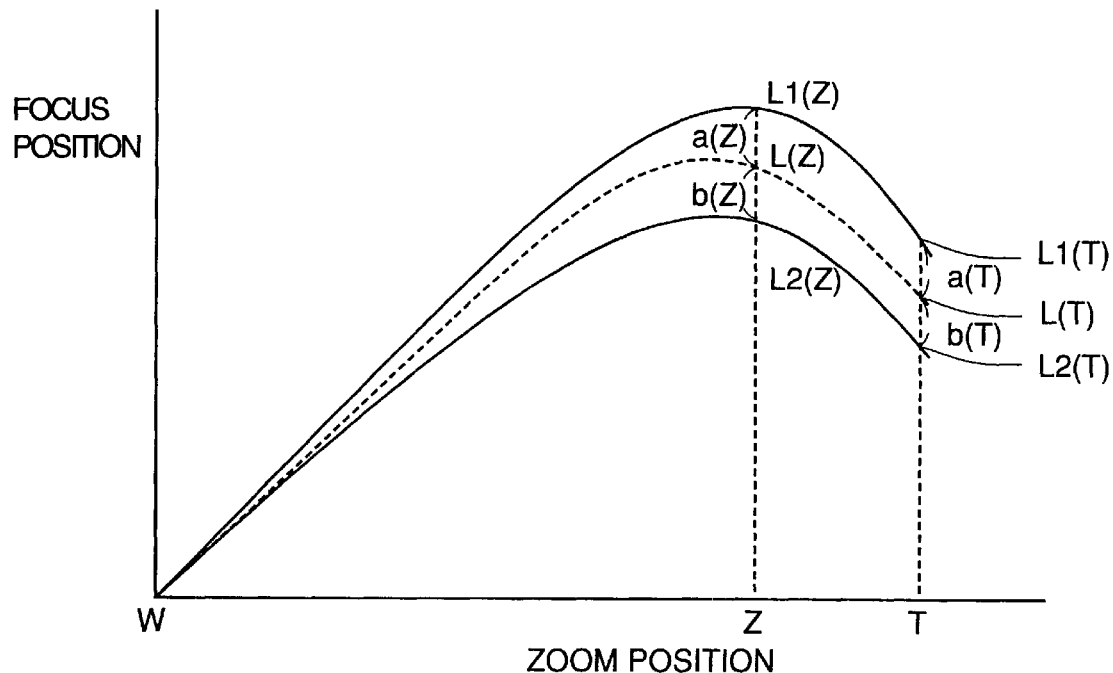
FIG. 2 is a diagram for describing the method of basic geometric division of a zoom tracking curve.

The basic interpolation method employing geometric division of a zoom tracking curve will be described with reference to FIG. 2. FIG. 2 is a graph showing a zoom tracking curve in which the zoom position is plotted along the abscissa and the focus position is plotted along the ordinate.

Here, an example will be described of obtaining a zoom tracking curve L(Z) with respect to an intermediate subject distance L through an interpolation process by geometric division between two zoom tracking curves L1(Z) and L2(Z) (Z is an arbitrary zoom position) with respect to two different subject distance L1 and L2 out of the plurality of zoom tracking curves stored in memory 16.

First, values L1(T) and L2(T) taken by the two zoom tracking curves L1(Z) and L2(Z) at one end position T of the telephoto side of the zoom position along the abscissa are divided by a certain ratio. A new zoom tracking curve L(Z) is drawn that constantly takes a value L(Z). L(Z) corresponds to the values taken by zoom tracking curves L1(Z) and L2(Z) at an arbitrary zoom position Z divided by the same certain ratio.

More specifically, when the value of L1(T) minus L(T) is a(T) and the value of L(T) minus L2(T) is b(T) at the end portion T of the zoom position, and the value of L1(Z) minus L(Z) is a(Z)=L1(Z)−L(Z) and the value of L(Z) minus L2(Z) is b(Z)=L(Z)−L2(Z) at the arbitrary zoom position Z, a new zoom tracking curve with respect to subject distance L by geometric division is obtained by drawing a curve L(Z) that always satisfies a (Z):b (Z)=a (T):b (T).

However, such a zoom tracking curve obtained by an interpolation process of geometric division may cause defocus, as described before, since it includes an error at the subject distance in the proximity of the area intermediate the subject distance of the two tracking curves. In view of the foregoing, the present invention carries out error correction in the interpolation process by the method set forth in the following.

Considering that the error is greatest with respect to the most intermediate subject distance of respective subject distance L1 and L2 for zoom tracking curves L1(Z) and L2(Z), a zoom tracking curve for the most intermediate subject distance is first drawn by the above-described geometric division. Then, the error between a calculated value on the obtained curve and a corresponding design value is identified at each subdivided point of the zoom position that is equally divided.

Figure 3:
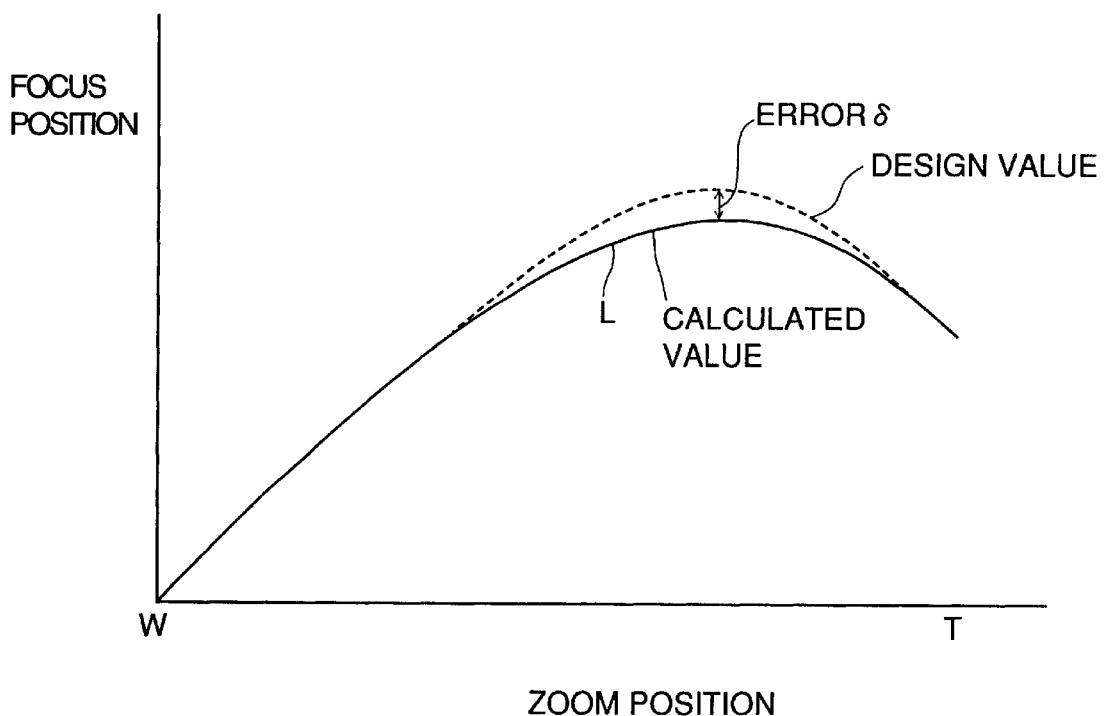
FIG. 3 is a diagram showing the error between an interpolated zoom tracking curve and a design value.

FIG. 3 shows a curve of the design value (dotted line) with respect to the zoom tracking curve L obtained by interpolation processing, and an error δ therebetween. It is appreciated from FIG. 3 that this error δ is a function δ(Z) that changes depending upon zoom position Z.

As a result of actually confirming and evaluating the tracking accuracy and the like, correction value α(Z) with respect to the calculated value at each zoom position is determined as α(Z)=δ(Z)/2. This correction data α(Z) is prestored in memory 16.

A method of the interpolation process on a zoom tracking curve employing such correction data α(Z) will be described specifically according to the present invention hereinafter.

It is assumed that an in-focus state is obtained at a certain zoom position (for example, the position corresponding to end portion T in FIG. 2) with respect to a subject at a subject distance between referenced zoom tracking curves L1(Z) and L2(Z). When tracking is to be commenced from that position, correction value α=δ/2 corresponding to that zoom position is read out from the memory. A focus position is calculated by subtracting this correction value α from the focused position.

Then, the aforementioned geometric division is carried out on two known zoom tracking curves corresponding to that zoom position according to the focus position obtained by subtracting correction value α to obtain an interpolated zoom tracking curve. A curve having correction value α(Z) added to that obtained curve is taken as the eventual corrected zoom tracking curve. Focus tracking control is carried out according to this curve.

Figure 4:
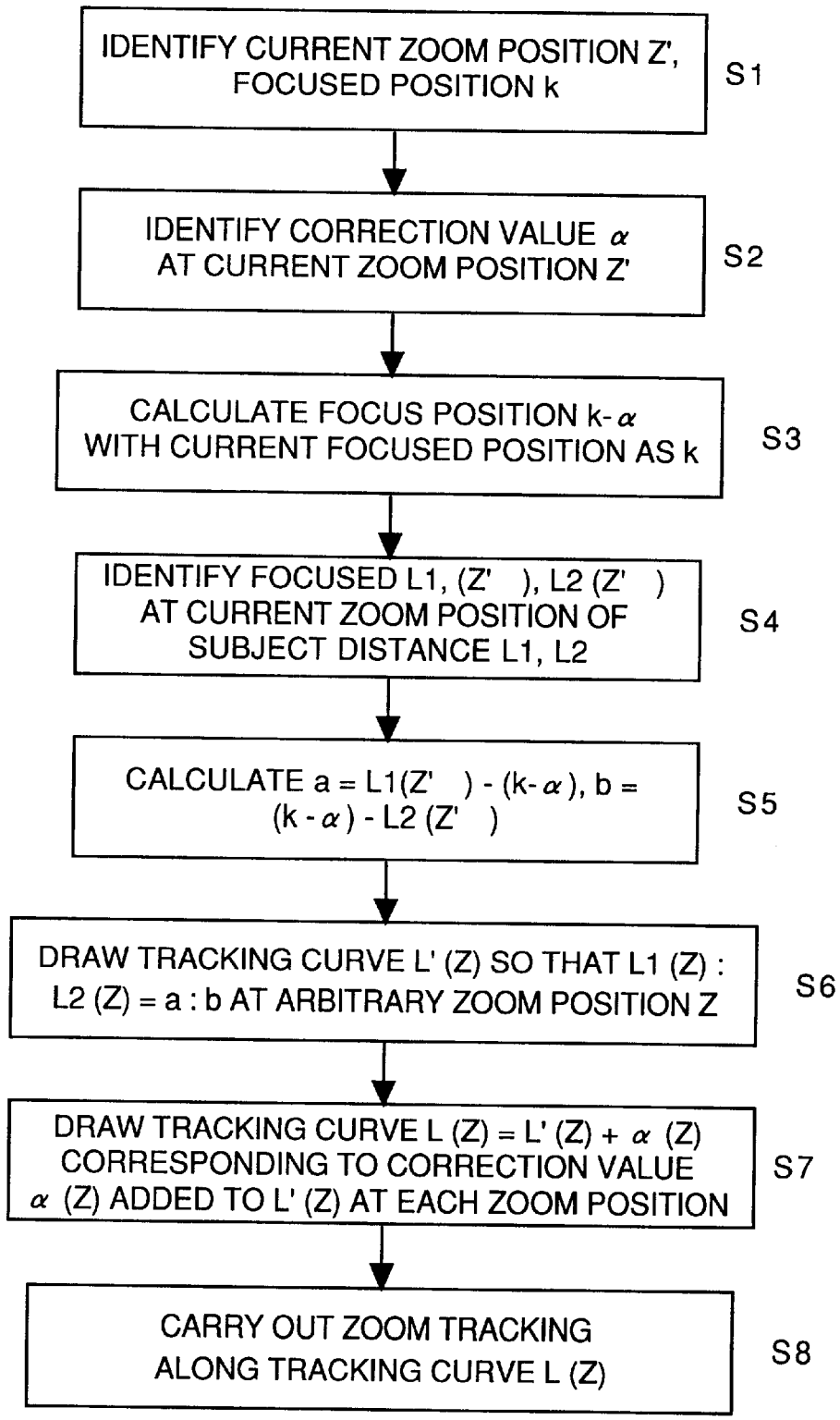
FIG. 4 is a flow chart showing an interpolation process according to an embodiment of the present invention.

In the embodiment of the present invention of FIG. 1, such an interpolation process is executed using a software by control circuit 10 formed of a microcomputer. Such a software will be described with reference to FIG. 4. In the following description, the zoom tracking curve corresponding to a nearby point L1 is L1(Z), and the zoom tracking curve corresponding to a remote point L2 is L2(Z), as to the two different subject distance of L1 and L2.

At step S1, control circuit 10 identifies the current zoom position Z' and the focused position k according to the outputs of encoder 8 and reference position sensor 12, assuming that an in-focus state is obtained at the current zoom position Z'.

At step S2, control circuit 10 identifies correction value α corresponding to the current zoom position according to the data of pre calculated correction value α(Z) stored in memory 16.

At step S3, control circuit 10 calculates focus position k−α that is the current identified focused position k minus correction value α.

At step S4, control circuit 10 identifies focused positions L1(Z') and L2(Z') for the current zoom position according to the two zoom tracking curves L1(Z) and L2(Z) prestored in memory 16 to enter the geometric division process.

At step S5, control circuit 10 calculates value "a" that is L1(Z') minus (k−α) and value "b" that is (k−α) minus L2(Z') (corresponding to a (T), b(T) of FIG. 2).

At step S6, a tracking curve L'(Z) is drawn so that the relationship L1(Z):L2(Z)=a:b is always established at arbitrary zoom position Z.

At step S7, a zoom tracking curve L(Z)=L'(Z)+α(Z) exceeding tracking curve L'(Z) by correction value α(Z) read out from memory 16 is calculated. At step S8, focus tracking control is carried out according to zoom tracking curve L(Z).

INDUSTRIAL APPLICABILITY

According to the present invention, correction based on an error in a conventional interpolation process is applied in the interpolation process of a zoom tracking curve. Therefore, defocus will not occur in the focus tracking control with respect to a subject located at an intermediate subject distance. Only the storage capacity for the correction data is to be added. Thus, focus tracking control of high accuracy can be realized by a slight addition of storage capacity in contrast to the case where the data of zoom tracking curves for every subject distance is stored.

What is claimed is:

1. An autofocus device of image sensing apparatus, comprising:

a memory to store data of a plurality of zoom tracking curves corresponding respectively to a plurality of different subject distances, and correction data calculated in advance;

a control circuit to carry out a predetermined interpolation process using said data of a plurality of zoom tracking curves and said correction data for calculating a zoom tracking curve with respect to a subject distance differing from said plurality subject distances, said correction data calculated based on an error function in the calculated zoom tracking curve, and to track focus according to said calculated zoom tracking curve, wherein said correction data is calculated based on the formula α(Z)=δ(Z)/2, where α is the correction value, Z is the zoom position, and δ is an error value between the calculated zoom tracking curve and a design curve.

2. A method of correcting a zoom tracking curve of an autofocus device, said method comprising the steps of:

preparing memory in which are stored data of a plurality of zoom tracking curves corresponding respectively to a plurality of different subject distance, and correction data calculated according to a zoom tracking curve obtained by a predetermined interpolation process with respect to a predetermined subject distance that is intermediate said plurality of subject distance, calculating a focus position which is said correction data subtracted from a current focus position, geometric-dividing said plurality of zoom tracking curves on the basis of said calculated focus position, calculating, in advance of preparing said memory means, said correction data based on the formula α(Z)=δ(Z)/2, where α is the correction value, Z is the zoom position, and δ is an error value between the calculated zoom tracking curve and a design curve; and adding said correction data to said curve obtained by geometric division to obtain a zoom tracking curve with respect to a subject distance differing from said plurality of subject distances.

3. The zoom tracking curve correction method according to claim 2, wherein said correction data is calculated according to said zoom trackingcurve obtained with respect to said intermediate predetermined subject distance and a design value.

4. An autofocus device of image sensing apparatus, comprising:

a memory to store data of a plurality of zoom tracking curves corresponding respectively to a plurality of different subject distances, and correction data calculated according to a zoom tracking curve obtained by a predetermined interpolation process with respect to a predetermined subject distance that is intermediate said plurality of subject distance;

a control circuit to carry out a predetermined interpolation process using said data of a plurality of zoom tracking curves and said correction data for calculating a zoom tracking curve with respect to a subject distance differing from said plurality of subject distances, said correction data calculated based on an error function in the calculated zoom tracking curve, and to track focus according to said calculated zoom tracking curve, wherein said correction data is calculated based on the formula $\alpha(Z)=\delta(Z)/2$, where $\alpha$ is the correction value, Z is the zoom position, and $\delta$ is an error value between the calculated zoom tracking curve and a design curve.

5. The autofocus device of image sensing apparatus according to claim 4, wherein said control circuit calculates a focus position which is said correction data subtracted from a current focused position, geometrically-divides said plurality of zoom tracking curves on the basis of said calculated focus position, and adds said correction data to said curve obtained by geometric division for obtaining a zoom tracking curve with respect to said different subject distance.

6. The autofocus device of image sensing apparatus according to any one of claims 5, 3, or 1, wherein said correction data is calculated according to a zoom tracking curve obtained with respect to said intermediate predetermined subject distance and a design value.

* * * * *